(12) United States Patent
Li et al.

(10) Patent No.: US 6,194,008 B1
(45) Date of Patent: Feb. 27, 2001

(54) ENVIRONMENTALLY FRIENDLY CHEWING GUM BASES INCLUDING POLYHYDROXYALKANOATES

(75) Inventors: Weisheng Li, Montclair; Charles P. Orfan, Howell; Jingping Liu, Highland Park; John W. Foster, Piscataway, all of NJ (US)

(73) Assignee: Wm. Wrigley Jr. Company, Chicago, IL (US)

( * ) Notice: Subject to any disclaimer, the term of this patent is extended or adjusted under 35 U.S.C. 154(b) by 0 days.

(21) Appl. No.: 09/601,818

(22) PCT Filed: Feb. 9, 1998

(86) PCT No.: PCT/US98/02511
§ 371 Date: Oct. 2, 2000
§ 102(e) Date: Oct. 2, 2000

(87) PCT Pub. No.: WO99/39588
PCT Pub. Date: Aug. 12, 1999

(51) Int. Cl.$^7$ ........................................ A23G 3/30
(52) U.S. Cl. .................................................. 426/6
(58) Field of Search ............................... 426/3, 6

(56) References Cited

U.S. PATENT DOCUMENTS

| 4,385,072 | * | 5/1983 | Schreck et al. | 426/3 |
| 4,539,209 | * | 9/1985 | Wilson et al. | 426/3 |
| 5,580,590 | * | 12/1996 | Hartman | 426/3 |
| 5,672,367 | * | 9/1997 | Grijpma et al. | 426/6 |

* cited by examiner

*Primary Examiner*—Arthur L. Corbin
(74) *Attorney, Agent, or Firm*—Bell, Boyd, & Lloyd LLC

(57) ABSTRACT

Chewing gum bases, and resultant chewing gums, that are environmentally friendly are provided. The chewing gum base comprising approximately 1 to about 99% by weight polyhydroxyalkanoates having side chain lengths of $C_4$ to $C_{30}$.

20 Claims, 1 Drawing Sheet

ENVIRONMENTALLY FRIENDLY CHEWING GUM BASES INCLUDING POLYHYDROXYALKANOATES

BACKGROUND OF THE INVENTION

The present invention relates generally to chewing gum compositions and methods for making same. More specifically, the present invention relates to chewing gum compositions that are more environmentally acceptable than typical compositions.

For hundreds of years, people have enjoyed chewing gum like substances. In the late 1800's, the predecessor to today's chewing gum compositions were developed. Today chewing gum is enjoyed daily by millions of people worldwide.

Chewed gum is usually disposed of in the wrapper that initially houses the chewing gum. Likewise, chewed gum can be disposed of in other substrates by wrapping the substrate around the chewed gum.

Although chewed gum can be easily disposed of without creating any problems, chewed gum when improperly disposed can create environmental issues. In this regard, the improper disposal of chewed gum, e.g., expectorating the chewed gum on a sidewalk, floor, or like area can create a nuisance. Typically, these gum cuds are mainly composed of a water insoluble masticatory part which is represented by the gum base. Due to their formulations, these gum cuds have an adhesive like characteristic. Therefore, the chewed gum cuds can stick to surfaces on to which they are placed. This can create environmental sanitation issues if the chewed gum cuds are improperly discarded.

SUMMARY OF THE INVENTION

The present invention provides a chewing gum base, and resultant chewing gum, that is environmentally friendly. As used herein the term "environmentally friendly" refers to a chewing gum composition that: will degrade; and can be easily removed from indoor or outdoor surfaces.

Pursuant to the present invention environmentally friendly gum bases are provided that include polyhydroxyalkanoates.

To this end, the present invention provides a chewing gum base comprising approximately 1 to about 99% by weight polyhydroxyalkanoates having side chain lengths of $C_4$ to $C_{30}$.

The polyhydroxyalkanoates can be either homopolymers or copolymers of monomers with different side chains.

In an embodiment, the gum base does not include non-biodegradable rubbers and resins.

In an embodiment, the polyhydroxyalkanoates have side chain lengths of $C_6$ to $C_{22}$.

In an embodiment, the polyhydroxyalkanoates comprise approximately 10% to about 99% by weight of the gum base.

In an embodiment, the polyhydroxyalkanoate is derived from natural occurring plants.

In an embodiment, the polyhydroxyalkanoate is derived from a fermentation process.

In an embodiment, the polyhydroxyalkanoate is derived from a transgenic plants.

In an embodiment, the polyhydroxyalkanoates include low molecular weight biodegradable resins.

In an embodiment, the low molecular weight biodegradable resins are chosen from the group consisting of polyterpenes and wood rosin esters.

In another embodiment of the present invention, a chewing gum base free of non-biodegradable rubbers and resins is provided comprising approximately 3% to about 99% by weight polyhydroxyalkanoates having side chain lengths of $C_4$ to $C_{30}$ and a filler.

In an embodiment, the filler is chosen from the group comprising of zein, oat fiber, gluten, casein, cellulose, as well as calcium carbonate, talc, magnesium silicate, and other inorganic fillers.

In an embodiment, the polyhydroxyalkanoates have side chain lengths of $C_6$ to $C_{20}$.

In an embodiment, the polyhydroxyalkanoates comprise approximately 10% to about 80% by weight of the gum base.

In an embodiment, the polyhydroxyalkanoate is derived from natural occurring plants.

In an embodiment, the polyhydroxyalkanoate is derived from a fermentation process.

In still another embodiment, a chewing gum is provided comprising a water soluble portion and a water insoluble base that includes at least one polyhydroxyalkanoate having a chain length of $C_4$ to $C_{30}$.

It is an advantage of the present invention to provide an environmentally friendly chewing gum base.

Still further, it is an advantage of the present invention to provide a chewing gum composition made from an environmentally friendly chewing gum base.

Another advantage of the present invention is to provide a degradable chewing gum containing an environmentally friendly chewing gum base.

Moreover, an advantage of the present invention is to provide a chewing gum composition that when chewed, if improperly discarded will degrade naturally.

An additional advantage of the present invention is to provide a gum base that includes environmentally friendly polyesters derived from either fermentation of carbohydrates or extraction of natural plants.

Still, an advantage of the present invention is to provide a source of polyesters for the gum base that are from renewable resources.

Additional features and advantages of the present invention are described in, and will be apparent from the detailed description of the presently preferred embodiments and from the drawings.

DETAILED DESCRIPTION OF THE PRESENTLY PREFERRED EMBODIMENTS

Figure 1:
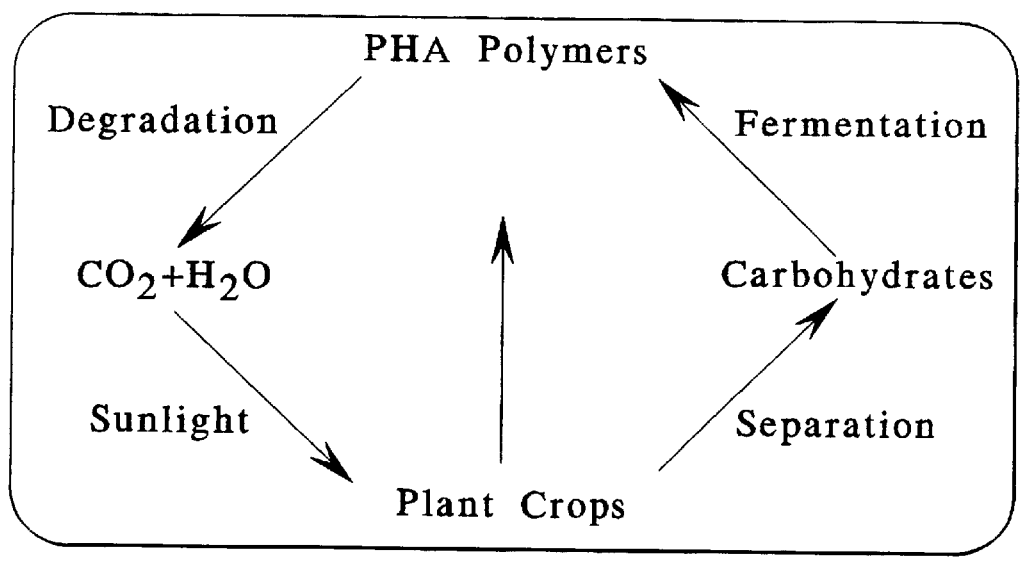
FIG. 1 illustrates schematically the synthesis and degradation of polyhydroxyalkanoates. As shown, they are from renewable resources and therefore are much more environmentally friendly than petroleum-based synthetic polymers.

The present invention provides improved chewing gum base. Specifically, the present invention provides chewing gum bases that are environmentally friendly. In this regard, the chewing gum base includes polyhydroxyalkanoates. Additionally, improved chewing gums as well as ingredients used for chewing gum bases are described.

The chewing gum base of the present invention includes polyhydroxyalkanoates. It has been surprisingly found that gum bases formed with polyhydroxyalkanoates can be constructed so that they are biodegradable. Additionally, the chewing gums made from such gum bases possess similar characteristics to conventional chewing gums.

Polyhydroxyalkanoates are a class of polymers that have rapid biodegradability. Polyhydroxyalkanoates exist in some natural plants and also can be synthesized by a fermentation process. Thus, polyhydroxyalkanoates are renewable polyesters that can be used to construct chewing gum. FIG. 1 illustrates schematically the cycle of polyhydroxyalkanoates.

Polyhydroxyalkanoates have the following general structure:

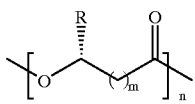

where R=H—$C_{11}$, and m=0–3

Depending on the length of the side chain "R", the polymers can either be plastics (short side chains) or elastomers (long side chains). Short side chain polyhydroxyalkanoates tend to be highly crystalline and lack elasticity. They do not therefore offer certain of the desirable chewing characteristics required by chewing gums.

Polyhydroxyalkanoates with long side chains, such as those having at least four carbon lengths, e.g. $C_4$–$C_{30}$, have very little crystallinity and possess high elasticity. This is due to an increase in free volume. These long side chain polyhydroxyalkanoates can thereby be used to replace rubbers and resins that are used in conventional gum bases. This results in a gum base that is not only readily biodegradable, but, additionally the ingredients are from renewable resources. Moreover, the resultant gums possess similar chewing characteristics to conventional chewing gums.

The present invention can be used to construct a variety of chewing gums. In general, a chewing gum composition typically comprises a water-soluble bulk portion, a water-insoluble chewable gum base portion and flavoring agents. The water-soluble portion dissipates with a portion of the flavoring agent over a period of time during chewing. The gum base portion is retained in the mouth throughout the chew. The term chewing gum refers to both a chewing and a bubble gum type gum in its general sense.

The insoluble portion of the gum, usually referred to as the gum cud, typically may contain any combination of elastomers, vinyl polymers, elastomer plasticizers, fillers, softeners, waxes and other optional ingredients such as colorants and antioxidants.

The variety of gum base ingredients typically used provide the ability to modify the chewing characteristics of gums made from the gum base.

Elastomers provide the rubbery, cohesive nature to the gum which varies depending on this ingredient's chemical structure, level in the gum base, and how it may be compounded with other ingredients.

Elastomers suitable for use in the gum base and gum of the present invention include polyhydroxyalkanoates having linear or branched saturated or unsaturated side chains of $C_4$–$C_{30}$. Preferably, the polyhydroxyalkanoates have normal or iso-side chains of $C_4$–$C_{20}$, and most preferably $C_8$–$C_{18}$. The polyhydroxyalkanoates elastomers can have only one-size side chains, or any combination of different side chains throughout the polymer main chains.

Natural elastomers used in conventional gum bases may include natural rubber such as smoked or liquid latex and guayule, natural gums such as jelutong, lechi caspi perillo, massaranduba balata, massaranduba chocolate, nispero, rosidinha, chicle, gutta percha, gutta kataiu, niger gutta, tunu, chilte, chiquibul, gutta hang kang. Synthetic elastomers used in conventional gum bases may include high molecular weight elastomers such as butadiene-styrene copolymers and isobutylene-isoprene copolymers, low to high molecular weight elastomers such as polybutadiene and polyisobutylene, vinyl polymeric elastomers such as polyvinyl acetate, polyethylene, vinyl copolymeric elastomers such as vinyl acetate/vinyl laurate, vinyl acetate/vinyl stearate, ethylene/vinyl acetate, polyvinyl alcohol or mixtures thereof.

The elastomers for use in a gum base or gum of the present invention are the polyhydroxyalkanoates alone or in combination with other typical gum base ingredients. However, the gum base and gum of the present invention are free of non-degradable elastomers such as butadiene-styrene copolymers, isobutylene-isoprene copolymers, polybutadiene, polyisobutylene, and vinyl polymeric elastomers (polyvinyl acetate, polyethylene, vinyl acetate/vinyl laurate, vinyl acetate/vinyl stearate, ethylene/vinyl acetate) or mixtures thereof.

More preferably, the polymers used are polyhydroxyalkanoates alone, as better illustrated in the pending Examples below.

Other optional ingredients such as antioxidants may also be used in the gum base. Antioxidants prolong shelf-life and storage of gum base, finished gum or their respective components including fats and flavor oils. Antioxidants suitable for use in gum base or gum of the present invention include butylated hydroxyanisole (BHA), butylated hydroxytoluene (BHT), beta-carotenes, tocopherols, acidulants such as Vitamin C, ascorbic acid, propyl gallate, other synthetic and natural types of mixtures thereof.

Preferably, the antioxidants used in the gum base are butylated hydroxyanisole (BHA), butylated hydroxytoluene (BHT), tocopherols, or mixtures thereof.

Waxes aid in the curing of the gum made from the gum base as well as improve shelf-life and texture. Wax crystal also improves the release of flavor. The smaller crystal size allows slower release of flavor since there is more hindrance of the flavor's escape from this wax versus a wax having larger crystal sizes.

Elastomer plasticizers vary the firmness of the gum base. Their specificity on elastomer inter-molecular chain breaking (plasticizing) along with their varying softening points cause varying degrees of finished gum firmness and compatibility when used in base. This may be important when one wishes to provide more elastomeric chain exposure to the alkanic chains of the waxes.

Elastomer plasticizers optionally suitable for use in the present invention include natural rosin esters such as glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, partially hydrogenated methyl esters of rosin, pentaerythritol ester of rosin, synthetic elastomer plasticizers such as terpene resins derived from alpha-pinene, beta-pinene and/or d-limonene and mixtures thereof.

Occasionally, both terpene and rosin ester resins may be used in the present invention. The terpene rosin ester ratios may range from about 1:15 to about 15:1.

Softeners modify the texture of the base and introduce sharp melting transitions during chewing. Softeners suitable for use in the gum base and gum of the present invention include triglycerides of non-hydrogenated, partially hydrogenated and fully hydrogenated cottonseed, soybean, palm, palm kernel, coconut, safflower, tallow, cocoa butter, medium chain triglycerides and the like.

The preferred softeners include unsaturated, partially saturated or fully saturated oils that contain, as one or more of their constituent groups, fatty acids of carbon chain length of from 6 to 18.

Monoglycerides, diglycerides, acetylated monoglycerides, distilled mono- and diglycerides and lecithin may, from their manufacturing processing, contain triglyceride levels less than 2 percent by weight. Though these ingredients are softeners, they would not be considered as being of the same family as the above mentioned softeners oils and would be in a family of their own, namely emulsifiers.

Optional fillers used in gum base modify the texture of the gum base and aid in processing. Fillers suitable for use in the gum base and gum of the present invention include carbonate or precipitated carbonated types such as magnesium and calcium carbonate, ground limestone and silicate types such as magnesium and aluminum silicate, clay, alumina, talc, as well as titanium oxide, mono-, di- and tricalcium phosphate, cellulose polymers such as ethyl, methyl and wood or mixtures thereof.

The fillers can also be organic powders such as polystyrene, polyethylene, oat fiber, wood fiber, apple fiber, zein, gluten, gliadin, casein, etc. For the present invention, natural organic fillers such as zein, oat fiber, gluten, casein, and cellulose are preferred since they will aid in faster biodegradation.

Particle size has an effect on cohesiveness, density and processing characteristics of the gum base and its compounding. The smaller the particle size, the more dense and cohesive the final gum base. Also, by selecting fillers based on their particle size distribution, initial mass compounding may be varied, thus allowing alteration of the compounding characteristics of the initial mass during gum base processing and ultimately the final chew characteristics of gums made from these gum bases.

Talc filler may be used in the gum base and gum of the present invention that may come in contact with or employ acid flavors or provide an acidic environment needed to prevent degradation of an artificial sweetener by reacting with calcium carbonate type fillers. Mean particle size for calcium carbonate and talc fillers typically range from about 0.1 micron to about 15 microns.

More preferably, the optional fillers used have a mean particle size range from about 0.4 to about 14 microns and are calcium carbonate and talc.

The starting mass preferably may comprise one or more of filler, polyhydroxyalkanoates, and elastomer plasticizer. Preferably, the starting mass is comprised of some or all of the polyhydroxyalkanoates elastomer, some or all of the filler, and some or all of the elastomer plasticizer. The levels of gum base ingredients present in the starting mass may range from about 0 percent to about 40 percent elastomer plasticiser, 0–15 percent vinyl polymer, 0 to 40 percent fillers, and from about 10 percent to about 40 percent elastomer, all by weight of the gum base ingredient.

Flavorants and colorants impart characteristics or remove or mask undesired characteristics. Colorants may typically include FD&C type lakes, plant extracts, fruit and vegetable extracts and titanium dioxide. Flavorants may typically include cocoa powder, heat-modified amino acids and other vegetable extracts.

Preferably, the optional colorants and flavorants are FD&C lakes and cocoa powder respectively and are present at levels from about 0 percent to about 15 percent by weight.

Gum bases are typically prepared by adding an amount of the elastomer, elastomer plasticizer and filler, and on occasion a vinyl polymer, to a heated (50–240° F.) sigma blade mixer with a front to rear speed ratio of from about 1.2:1 to about 2:1, the higher ratio typically being used for chewing gum base which requires more rigorous compounding of its elastomers.

The initial amounts of ingredients comprising the initial mass may be determined by the working capacity of the mixing kettle in order to attain a proper consistency and by the degree of compounding desired to break down the elastomer and increase chain branching. The higher the level of filler at the start or selection of a filler having a certain particle size distribution, the higher the degree of compounding and thus more of the elastomeric chain cross linking are broken, causing more branching of the elastomer thus lower viscosity bases and thus softer final gum base and gum made from such a base. The longer the time of compounding, the use of lower molecular weight or softening point gum base ingredients, the lower the viscosity and firmness of the final gum base.

Compounding typically begins to be effective once the ingredients have massed together. Anywhere from 15 minutes to 90 minutes may be the length of compounding time. Preferably, the time of compounding is from 20 minutes to about 60 minutes. The amount of added elastomer plasticizer depends on the level of elastomer and filler present. If too much elastomer plasticizer is added, the initial mass becomes over plasticized and not homogenous.

After the initial ingredients have mass homogeneously and compounded for the time desired, the balance of the base ingredients are added in a sequential manner until a completely homogenous molten mass is attained. Typically, any remainder of elastomer, elastomer plasticizer, vinyl polymer and filler, are added within 60 minutes after the initial compounding time. The filler and the elastomer plasticizer would typically be individually weighed and added in portions during this time. The optional waxes and the oils are typically added after the elastomer and elastomer plasticizers and during the next 60 minutes. Then the mass is allowed to become homogenous before discharge.

Typical base processing times may vary from about one to about three hours, preferably from about 1½ to 2½ hours, depending on the formulation. The final mass temperature when dumped may be between 70° C. and 130° C. and preferably between 100° C. and 120° C. The completed molten mass is emptied from the mixing kettle into coated or lined pans, extruded or cast into any desirable shape and allowed to cool and solidify. Those skilled in the art will recognize that many variations of the above described procedure may be followed.

Examples of the process to make the inventive gum base may differ from the typical process and are detailed in the pending Examples below. These are presented to exemplify embodiments of the present invention and in no way are presented to limit the scope of the present invention.

Gum formulas may comprise from about 10 to about 95 weight percent a gum base made in accordance with the present invention in a gum formula typically known to those in the art.

The water-soluble portion of the chewing gum may comprise softeners, sweeteners, flavoring agents and combinations thereof. The sweeteners often fill the role of bulking agents in the gum. The bulking agents generally comprise from about 5 percent to about 90 percent, preferably from about 20 percent to about 80 percent.

Softeners are added to the chewing gum in order to optimize the chewability and mouth feel of the gum. Softeners typically constitute from about 0.5 percent to about 25.0 percent by weight of the chewing gum. Softeners contemplated for use in the gum include glycerin, lecithin and combinations thereof. Further, aqueous sweetener solutions such as those containing sorbitol, hydrogenated starch hydrolysates, corn syrup and combinations thereof may be used as softeners and bulking agents in gum. Sugar-free formulations are also typical.

Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The sweetener for use in the present invention can also be used in combination with sugarless sweeteners. Generally, sugarless sweeteners include components with sweetening characteristics but which are devoid of the commonly known sugars and comprise, but are not limited to, sugar alcohols such as sorbitol, mannitol, xylitol, hydrogenated starch hydrolysates, maltitol and the like, alone or in any combination.

Depending on the particular sweetness release profile and shelf-life stability needed, bulk sweeteners of the present invention can also be used in combination with coated or uncoated high-intensity sweeteners or with high-intensity sweeteners coated with other materials and by other techniques.

High-intensity sweeteners, or artificial sweeteners and peptide sweeteners as they may be referred to, typically may include, but are not limited to, alitame, thaumatin, aspartame, sucralose, acesulfame, saccharin and dihydrochalcones. The range of these sweetener types in gum typically may range from about 0.02 to 0.10 weight percent for sweeteners such as alitame, thaumatin and dihydrochalcones, and from about 0.1 to about 0.3 weight percent for sweeteners like aspartame, sucralose, acesulfame and saccharin.

A flavoring agent may be present in the chewing gum in an amount within the range from about 0.1 to about 10.0 weight percent and preferably from about 0.5 to about 3.0 weight percent of the gum. The flavoring agents may comprise essential oils, synthetic flavors, or mixtures thereof including, but not limited to, oils derived from plants and fruits such as citrus oils, fruit essences, peppermint oil, spearmint oil, clove oil, oil of wintergreen, anise and the like. Artificial flavoring components are also contemplated for use in gums of the present invention. Those skilled in the art will recognize that natural and artificial flavoring agents may be combined in any sensory acceptable blend. All such flavors and flavor blends are contemplated for use in gums of the present invention.

Optional ingredients such as colourants, emulsifiers and pharmaceutical agents may be added to the chewing gum.

In general, chewing gum is manufactured by sequentially adding the various chewing gum ingredients to a commercially available mixer known in the art. After the initial ingredients have been thoroughly mixed, the gum mass is discharged from the mixer and shaped into the desired form such as by rolling into sheets and cutting into sticks, extruded into chunks or casting into pellets.

Generally, the ingredients are mixed by first melting the gum base and adding s it to the running mixer. The base may also be melted in the mixer itself. Colourants or emulsifiers may also be added at this time. A softener such as glycerin may also be added at this time, along with syrup and a portion of the bulking agent/sweetener. Further portions of the bulking agent/sweetener may then be added to the mixer.

A flavoring agent is typically added with the final portion of the bulking agent/sweetener. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

By way of example, and not limitation, examples of the present invention will now be given:

EXAMPLE 1

To a laboratory gum base mixer (Plastograph from Brabender Corp., Rochelle Park, N.J.) set at 90° C., 35 grams of polyhydroxyalkanoate (PHA-1) was added, then 20 grams of calcium carbonate powder (mean particle=4.5–5. 0 micron) was slowly added while the mixer compounded the polymer. After 20 minute mixing, 2.5 grams of fully hydrogenated cotton seed oil and 2 grams of partially hydrogenated soya oil were added. The gum base was homogeneous and smooth.

The PHA-1 elastomer that was added was a copolymer of 3-hydroxctanote and 3-hydroxynhexanote (about 91:9 ratio). It possess a Tg of −35° C. A Tm of 61° C., and heat of fusion $\Delta H=15.0$ J/g as revealed by differential scanning calorimetry (DSC). Gel permation chromatography (GPC) showed Mn=75,000 and Mw=127,000 relative to polystyrene standards. X-ray crystallinity is less than 25%.

EXAMPLE 2

Same as Example 1, but PHA-2 was used in place of PHA-1. PHA-2 is a copolymer of units with side chains $C_8$ and $C_{10}$. It was much softer than PHA-1. GPC analysis showed Mn=65,000 g/mol and Mw=106,700 g/mol relative to polystyrene standards. DSC showed Tg=−30° C., Tm=61° C., and $\Delta H=15.0$ J/g.

EXAMPLE 3

Same as Example 1, but oat fiber (200 mesh through) was used to replace calcium carbonate.

EXAMPLE 4

Same as Example 1, but talc was used to replace calcium carbonate.

EXAMPLE 5

To a laboratory gum mixer set at 50° C. was added 25 grams of gum base Example 1, 77 grams of 6x sugar, 25.5 grams of 45Be corn syrup and mix them for 20 minutes. Then 0.6 g 96% glycerol and 0.8 grams of peppermint flavor was added. Additional 5 minutes was continued before discharging.

EXAMPLE 6

To the gum mixer set at 50° C. was added 20.0 grams of PHA-2, 5 grams of $C_aCO_3$ powder, 59.4 grams of 6× sugar powder, and 20 grams of 45 Be corn syrup.

After mixing for 20 minutes, 0.6 grams of peppermint oil were added. Additional 5 minutes mixing was extended before discharging the gum.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the attendant claims.

We claim:

1. A chewing gum base including polyhydroxyalkanoates having side chain lengths of $C_4$ to $C_{30}$.

2. The chewing gum base of claim 1 wherein the gum base does not include non-biodegradable rubbers and resins.

3. The chewing gum base of claim 1 wherein the polyhydroxyalkanoates have side chain lengths of $C_6$ to $C_{22}$.

4. The chewing gum of claim 1 wherein the polyhydroxyalkanoate comprise approximately 10% to about 99% by weight of the gum base.

5. The chewing gum base of claim 1 wherein the polyhydroxyalkanoate is derived from natural occurring plants.

6. The chewing gum base of claim 1 wherein the polyhydroxyalkanoate is derived from a fermentation process.

7. The chewing gum base of claim 1 wherein the polyhydroxyalkanoate is derived from a transgenic plant.

8. The chewing gum base of claim 1 wherein the polyhydroxyalkanoates include low molecular weight biodegradable resins.

9. The chewing gum base of claim 8 wherein the low molecular weight biodegradable resins are chosen from the group consisting of polyterpenes and wood rosin esters.

10. A chewing gum base free of non-biodegradable rubbers and resins comprising:

approximately 3% to about 99% by weight polyhydroxyalkanoates having side chain lengths of $C_4$ to $C_{30}$ and a filler.

11. The chewing gum base of claim 10 wherein the filler is chosen from the group consisting of zein, oat fiber, gluten, casein, cellulose, and inorganic fillers.

12. The chewing gum base of claim 10 wherein the polyhydroxyalkanoates have side chain lengths of $C_6$ to $C_{20}$.

13. The chewing gum base of claim 10 wherein the polyhydroxyalkanoates comprise approximately 10% to about 80% by weight of the gum base.

14. The chewing gum base of claim 10 wherein the polyhydroxyalkanoate is derived from natural occurring plants.

15. The chewing gum base of claim 10 wherein the polyhydroxyalkanoate is derived from a fermentation process.

16. The chewing gum base of claim 10 wherein the polyhydroxyalkanoate is derived from a transgenic plant.

17. A chewing gum comprising:

a water soluble portion; and a water insoluble base, including at least one polyhydroxyalkanoate having side chain lengths of $C_4$ to $C_{30}$.

18. The chewing gum of claim 17 wherein the water insoluble base does not include non-biodegradable rubbers and resins.

19. The chewing gum of claim 17 wherein the polyhydroxyalkanoates have side chain lengths of $C_4$ to $C_{20}$.

20. The chewing gum of claim 17 wherein the polyhydroxyalkanoates comprise approximately 10% to about 80% by weight of the gum base.

* * * * *